(12) United States Patent
Mercer et al.

(10) Patent No.: US 8,004,541 B2
(45) Date of Patent: Aug. 23, 2011

(54) STRUCTURED DISPLAY SYSTEM WITH SYSTEM DEFINED TRANSITIONS

(75) Inventors: Paul Mercer, Palo Alto, CA (US); Ralph Thomas, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 839 days.

(21) Appl. No.: 12/021,173

(22) Filed: Jan. 28, 2008

(65) Prior Publication Data
US 2009/0189915 A1 Jul. 30, 2009

(51) Int. Cl.
*G09G 5/00* (2006.01)
(52) U.S. Cl. ............................................ 345/646
(58) Field of Classification Search .................. 345/646, 345/655, 666, 681
See application file for complete search history.

(56) References Cited

U.S. PATENT DOCUMENTS

| | | | |
|---|---|---|---|
| 2002/0167503 A1 | 11/2002 | Tsunoda et al. | |
| 2006/0123360 A1 | 6/2006 | Anwar et al. | |
| 2007/0126742 A1* | 6/2007 | Bar-Lev et al. | 345/473 |
| 2007/0294619 A1* | 12/2007 | Krishnaswamy et al. | 715/704 |
| 2008/0001924 A1 | 1/2008 | de los Reyes et al. | |
| 2008/0005652 A1* | 1/2008 | Krishnaswamy et al. | 715/500.1 |
| 2009/0061837 A1* | 3/2009 | Chaudhri et al. | 455/418 |

OTHER PUBLICATIONS

PCT International Search Report and Written Opinion, PCT Application No. PCT/US2009/032059, Jul. 22, 2009, 9 pages.
SGH-G600 User's Guide, Samsung Electronics, Korea, Jul. 2007, pp. 1-50, [Online] [Retrieved on May 17, 2010] Retrieved from the InternetURL:http://downloadcenter.samsung.com/content/UM/200708/20070813102947984_SGH-G600_UG_EU_Eng_Ref.1.0_070726.pdf.

* cited by examiner

*Primary Examiner* — Jeffery A Brier

(57) ABSTRACT

A disclosed system (and method) is configured to receive an instruction to transition from a first view to a second view. The first view and the second view include two or more visual elements. The system receives data corresponding to visual elements in the first view and visual elements in the second view. The system groups the visual elements to include visual elements moved out between the first view and the second view, visual elements retained from the first view in the second view, and visual elements moved into the second view. The system retrieves a system defined transition style for rendering the visual elements between the first view and the second view. Using the groupings the system transitions the first view to render the second view through application of the transition style on the groups of visual elements.

26 Claims, 6 Drawing Sheets

STRUCTURED DISPLAY SYSTEM WITH SYSTEM DEFINED TRANSITIONS

BACKGROUND

1. Field of Art

The disclosure generally relates to the field of user interfaces, and more specifically, to a user interface that maintains visual continuity and consistency of transitions between views during navigation.

2. Description of the Related Art

On conventional computing devices a user interface consists of a series of independent display renditions. For example, when in a calendar application, to switch from one view, e.g., a month view, to a second view, e.g., a week view, the calendar application had to replace the month view from the screen with the week view, even if the two views had one or more visual elements in common.

In an attempt to maintain a semblance of continuity, some user interfaces frame a portion of the screen in order to keep context of subsequent views. The frames, however, are static and lose relevance as views are changed. This is often the problem with framed web pages. Moreover, the views that are changed within the frame are similar to conventional applications where one view is completely removed from the screen and the next view is redrawn on the screen.

Conventional user interfaces also are visually cumbersome. When transitioning between views within the interface a user loses visual continuity with respect to any activities that must be tracked from the first view to the second view. For example, the user interface typically removes the prior view and redraws the new view, which can leave the user disoriented due to the break in visual continuity. Even temporary disorientation by the user results in lost productivity and detachment from the interface interaction while the user reorients to the second view.

In an attempt to address the issue of continuity, some applications and their corresponding user interfaces have been redesigned using multimedia authoring software such as Adobe® Flash® or Macromedia® Director MX 2004®. However, the applications created with these tools are "hard coded" so that individual applications end up with their own unique look and feel and well as their own unique functional operation as seen by the user. Moreover, as view pages in the application change, the visual continuity is lost. Thus, there still is a lack of visual continuity among groups of application as well as a lack of visual consistency.

Hence, the current state of the art lacks a user interface and corresponding system and method for maintaining visual continuity and consistency between views when interacting with a user interface of one or more applications.

SUMMARY

One embodiment of a disclosed system (and method) includes rendering a user interface on a computing device screen, e.g., handheld computing device screen. The system manages user interface transitions within applications at a system level rather than an application level so that visual continuity and consistency is maintained during transitions in views.

In one embodiment, a system is configured to render two or more user interface views for applications. For this, the system is configured to receive an instruction to transition an interface from a first view to a second view. The first view and the second view include two or more visual elements. The system receives data corresponding to visual elements in the first view and visual elements in the second view. The system groups the visual elements, for example into sets. The groupings include visual elements removed from the first view to the second view, visual elements retained from the first view in the second view, and visual elements added into the second view that were not in the first view.

The system retrieves a system defined transition style for rendering the visual elements between the first view and the second view. The transition style relates to how visual elements are removed from or added to views. The transition style can include a curve, which defines additional properties relating to movement, such as acceleration, speed and the like. The transition style can be further configured to include system defined sequences, which corresponds to order of movement of visual elements, and control, which corresponds to particular movement within the screen such as path taken for placement of a visual element. It is noted that although the system may define a transition style, an application can be configured to override or supplement a style. Further, the override can be at granular levels, for example, at the element level.

Using the groupings the system transitions the first view to render the second view through application of the transition style, and if applicable the sequence and control, on the groups of visual elements. For the transition, the system is further configured to move visual elements retained from the first view from a first location on the screen to a second location of the screen for the second view. The system also is configured to remove from view during the transition the visual elements moved out from the first view and bring into view the visual elements moved into the second view that were not in the first view.

For each application and each transition between successive views it is noted that the process maintains visual continuity with visual elements within successive views. Moreover, because system level parameters are used for managing user interface actions within an application, rather than having the application manage those aspects, the system also maintains visual consistency. The continuity and consistency allows for activities involving the user interface to occur quickly while minimizing disruption to the user. Moreover, the visual continuity and consistency of movement between views beneficially keeps the user oriented on the interface, which increases productivity.

It is noted that the system can be configured for reversibility with the transition style applied the same in both directions. That is the transition style is the same in a forward direction and (e.g., from a current view to a next view) and back from it (e.g., from the current view to the prior view), for example, as a video play-reverse. In an alternate embodiment, the system can be configured for more robust reversibility whose applied style is at least partially independent of the other direction. For example, in the reverse direction a course may not change, but the curve would be different than the forward direction.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings, in which:

FIG. (FIG.) 1 illustrates one embodiment of a mobile computing device.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Mobile Computing Device

Figure 1:
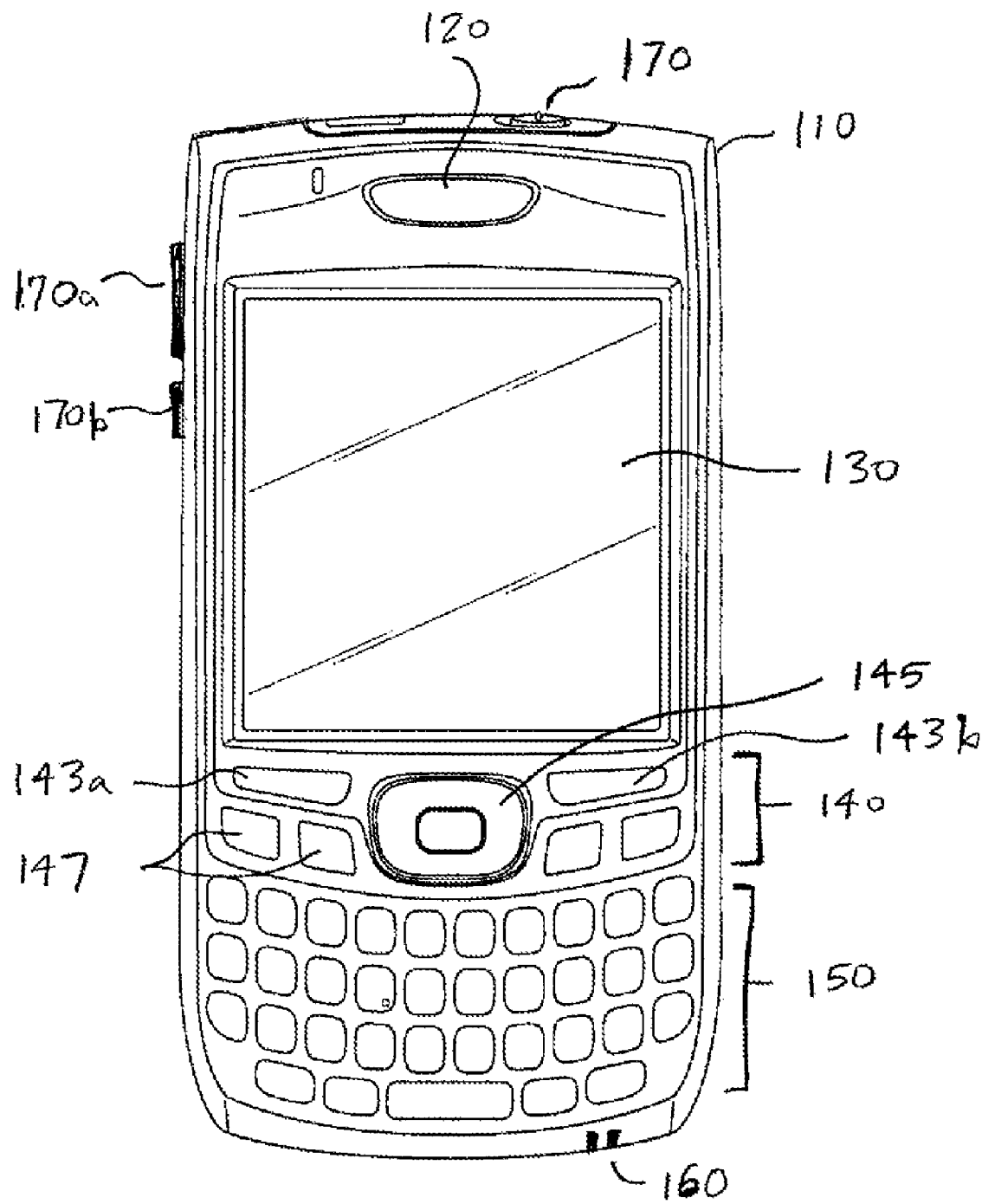

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 12.75 centimeters in width, 0.5 to 2.2 centimeters in height and weigh between 55 and 230 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 120 further comprises a touch-sensitive display (e.g., pressure-sensitive (resistive), electrically sensitive (capacitative), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is e.g., 4 or 5) navigation ring (or mechanism) 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dialpad) or a numeric keypad integrated with an alpha or alphanumeric keypad 160 (e.g., a keyboard with consecutive keys of Q-W-E-R-T-Y, A-Z-E-R-T-Y, or other equivalent set of keys on a keyboard or a Dvorak layout keyboard).

Although not illustrated, it is noted that the mobile computing device 110 also may include an expansion slot. The expansion slot is configured to receive and support expansion cards (or media cards), which may include memory cards such as CompactFlash™ cards, SD cards, XD cards, Memory Sticks™, MultiMediaCard™, SDIO, and the like. The expansion slot also can be configured to support dedicated applications located on, and executable through, an inserted card (e.g., a backup data card or specific application executable while resident on the card).

Example Mobile Computing Device Architectural Overview

Figure 2:
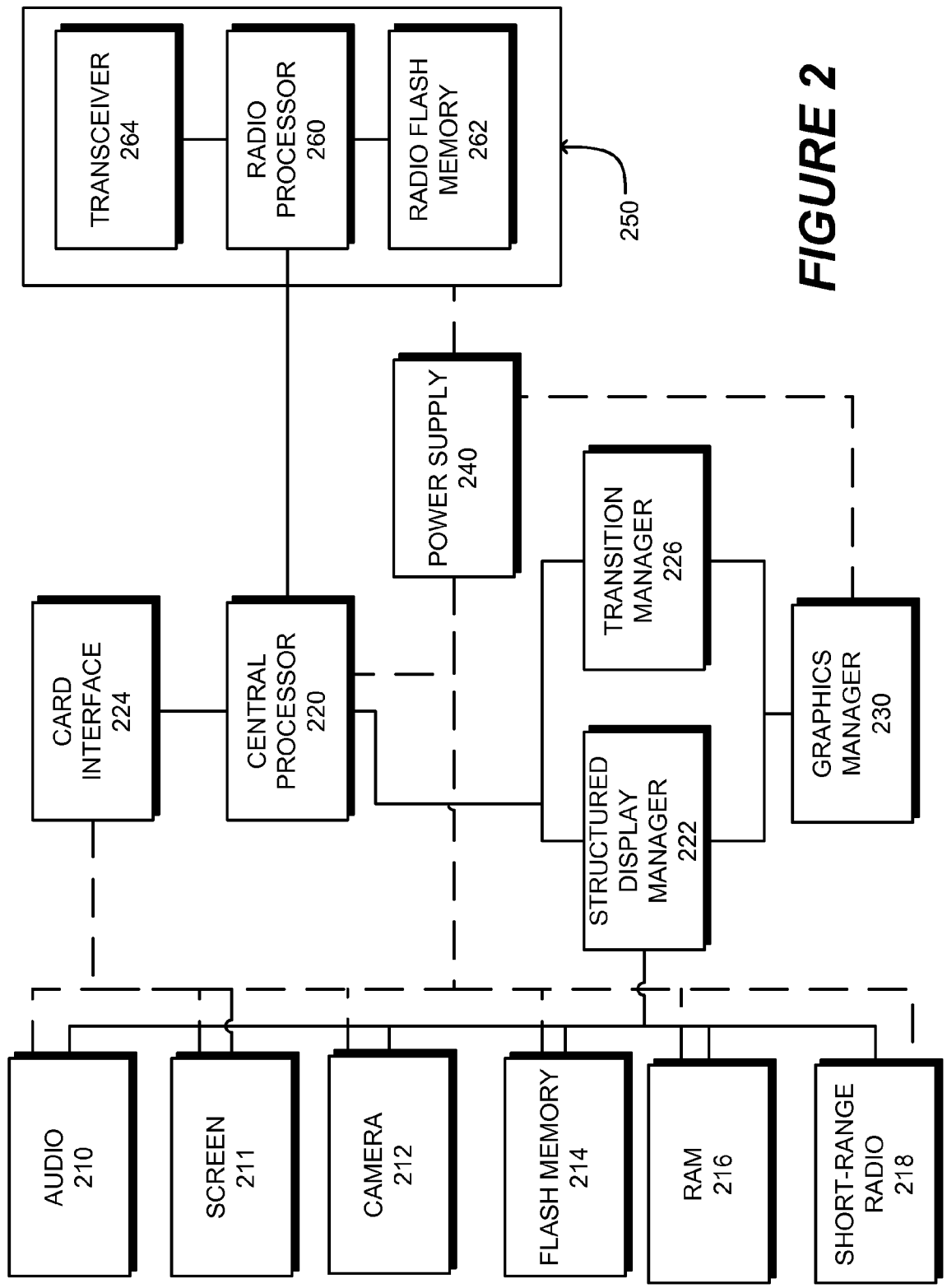
FIG. 2 illustrates one embodiment of an architecture of a mobile computing device.

Referring next to FIG. 2, a block diagram illustrates one embodiment of an example architecture of a mobile computing device 110 with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicatively couples with an audio (or audio module) 210, a screen (or screen module) 211 (for use with screen 130), a camera (or camera module) 212, a flash memory 214, RAM memory 216, a short range radio module 218 (e.g., Bluetooth, Wireless Fidelity (WiFi) component), a structured display manager (or module) 222 and a transition manager (or module) 226. The power supply 240 powers the central processor 220, the radio subsystem 250 and a graphics manager (or module) 230. It is noted that each of the disclosed managers may comprise a particular system (or subsystem) within the example mobile computing device. For example, the graphics manager 230 may comprise a graphics subsystem that includes all components necessary to render visual displays to the screen 130. The power supply 240 may correspond to a battery pack (e.g., rechargeable) or a powerline connection or component.

In one embodiment, the structured display manager 222 comprises a software or firmware embodied in instructions stored in a memory, e.g., flash memory 214 and/or RAM 26, and executable by a processor, e.g., central processor 220.

The structured display manager 222 is configured to manage visual elements of an application within one or more views displayed on the screen 130 through the screen system 211. The structured display manager 222 receives from an application two groups of data corresponding to the visual elements corresponding to the present and subsequent views of the user interface. For example, one group includes visual elements of a first view of the application and the second group includes visual elements in a subsequent second view of the application. The structured display manager 222 uses the received data corresponding to the visual elements in each view to create three groupings: (1) visual elements common to the two views; (2) visual elements that are removed from the first view; and (3) visual elements that are brought into (or added to) the second view.

The transition manager 226 comprises a software or firmware embodied in instructions stored in a memory, e.g., flash memory 214 and/or RAM 26, and executable by a processor, e.g., central processor 220. In one embodiment, the transition manager 226 transitions an application between a first view and a second view. In particular, the transition manager 226 uses the groups (e.g., sets) from the structured display manager to apply one or more transition styles, including (if applicable) curves, sequences and controls (or stages) to remove the first view and transition to the second view that will be displayed on the screen 130, e.g., through a graphics manager.

It is noted that a transition style defines transition appearance characteristics for visual elements for a view. The transition style includes format specifications, layout specifications, and how visual elements are removed from or added to a view on the screen 130. The transition style can include a curve as a function for a transition. For example, the curve function can describe acceleration, speed, and friction. It is noted that the curve can be predefined functions, e.g., constant speed, exponential speed etc., or can be described by a user or developer, e.g., algebraically, and stored as a function. In addition, the transition style can include movement that defines a course, for example, movement in a straight line, fade, fly-in, and the like.

The transition style also can include sequence and control. Sequence and control includes additional functional aspects of how movement of visual elements can be defined, for example, timing for travel on, off, or within the screen as a view takes shape, and path traveled and direction traveled relative to other visual elements and layout of view.

As will be further described within, operational advantages of the structured display manager 222 and the transition manager 226 include movement of visual elements from locations on screen in a first view to locations on screen in a second view while maintaining visibility (or visual continuity) of those one or more visual elements on the screen 130 when changing views. This beneficially is visually pleasing and helps maintain visual continuity and focus during view transitions.

In addition, properties corresponding to "physics" can be integrated into the definition of how visual elements will move. These physics properties may be particularly astute for touch screen applications, for example, as a user scrolls using the touch screen within the day view of the calendar application they may "hit" and endpoint on the day and "briefly bounce" or "rebound" to a stop at that point.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3 G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot expansion slot (not shown). The card interface 224 transmits data and/or instructions between the central processor and an expansion card or media card included in the expansion slot. The card interface 224 also transmits control signals from the central processor 220 to the expansion slot to configure an expansion card or media card included in the expansion slot.

In one embodiment, central processor 220 executes logic (for example, by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Structured Display with Automatic Transitions System

Figure 3A:
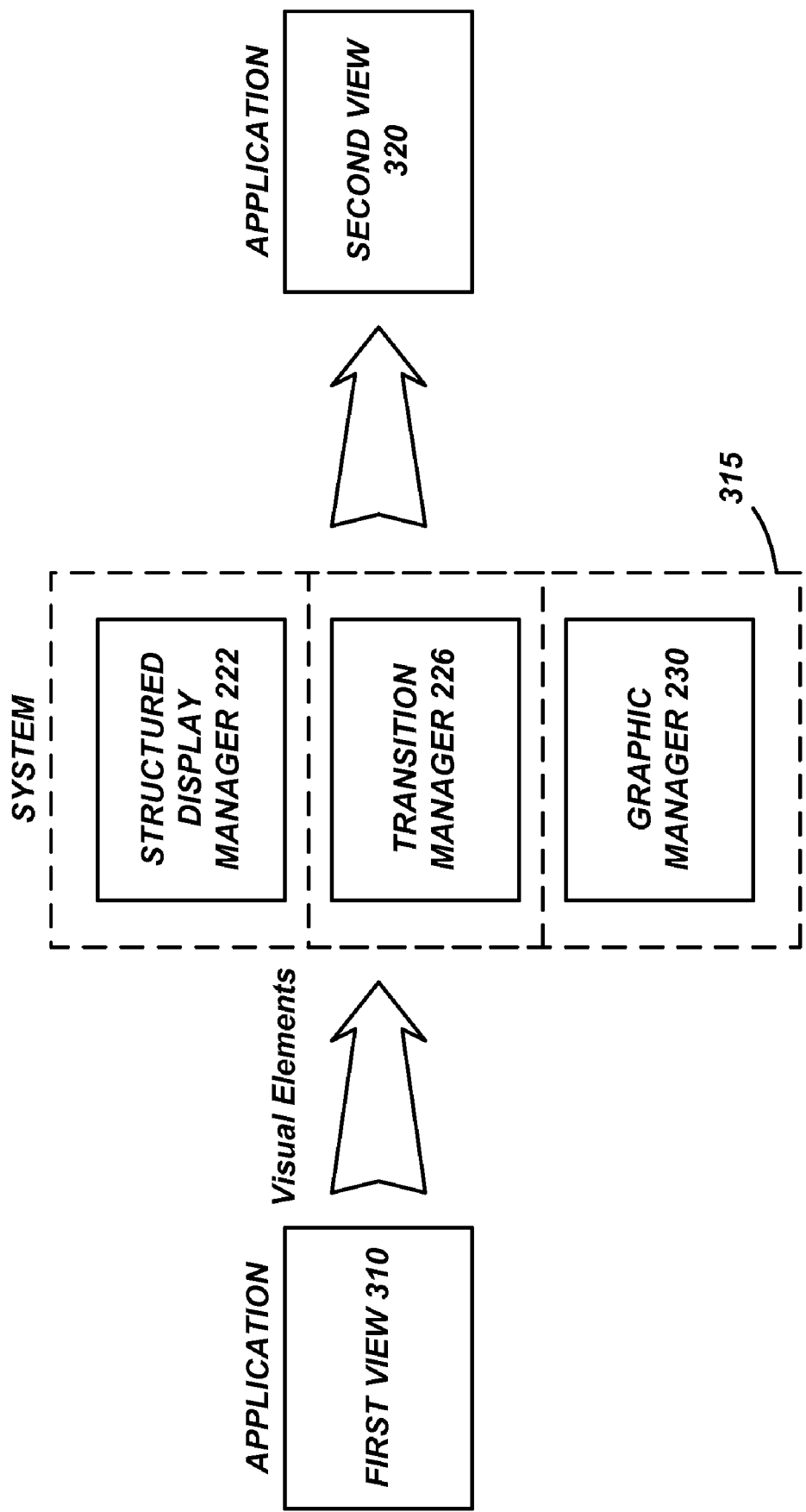
FIG. 3a illustrates one embodiment for a system to change views through a user interface of an application.
Figure 3B:
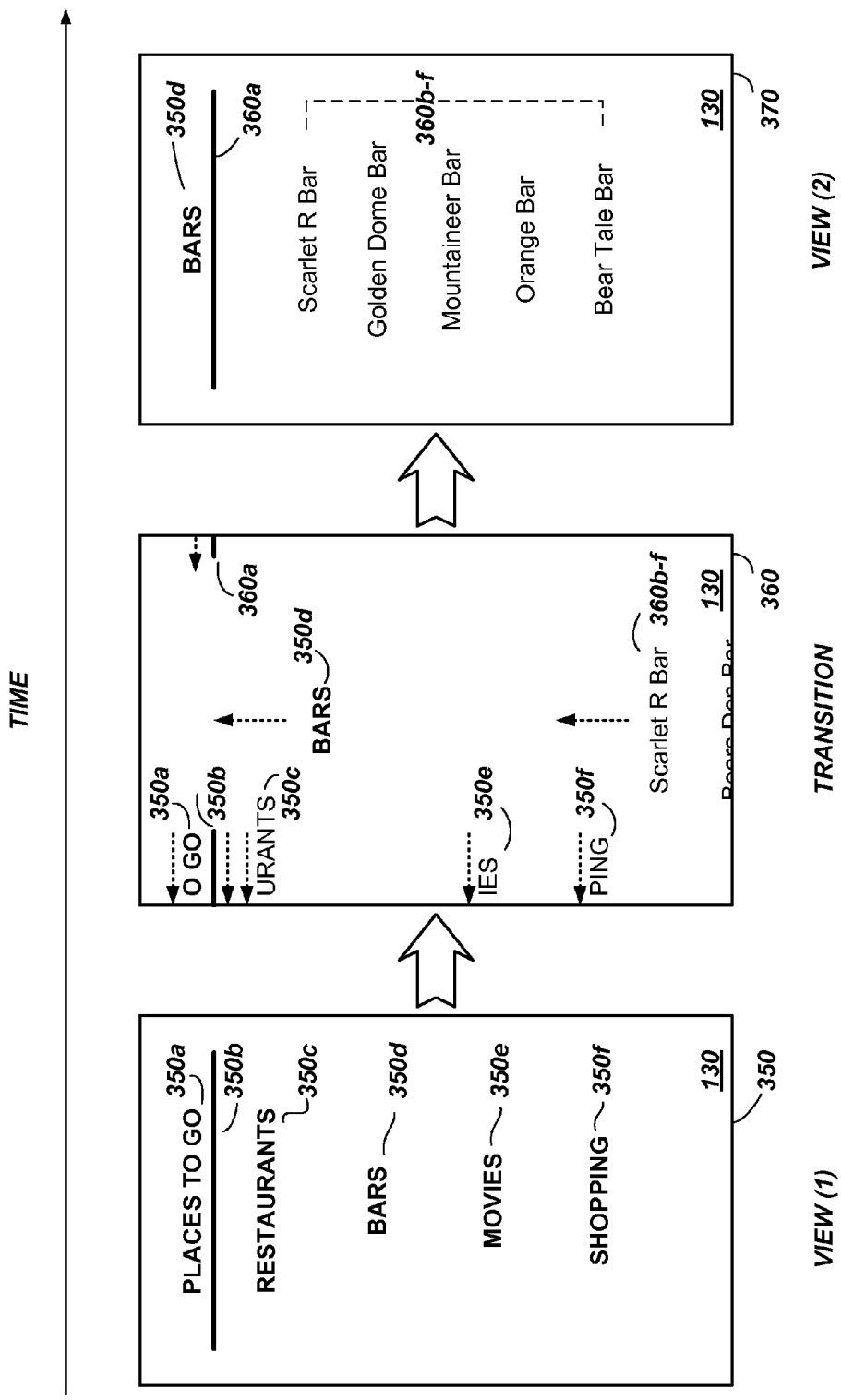
FIGS. 3b and 3c illustrate example embodiments of application user interfaces with transitions from a first view to a second view as viewed through a screen of a mobile computing device and rendered through a visual subsystem.
Figure 3C:
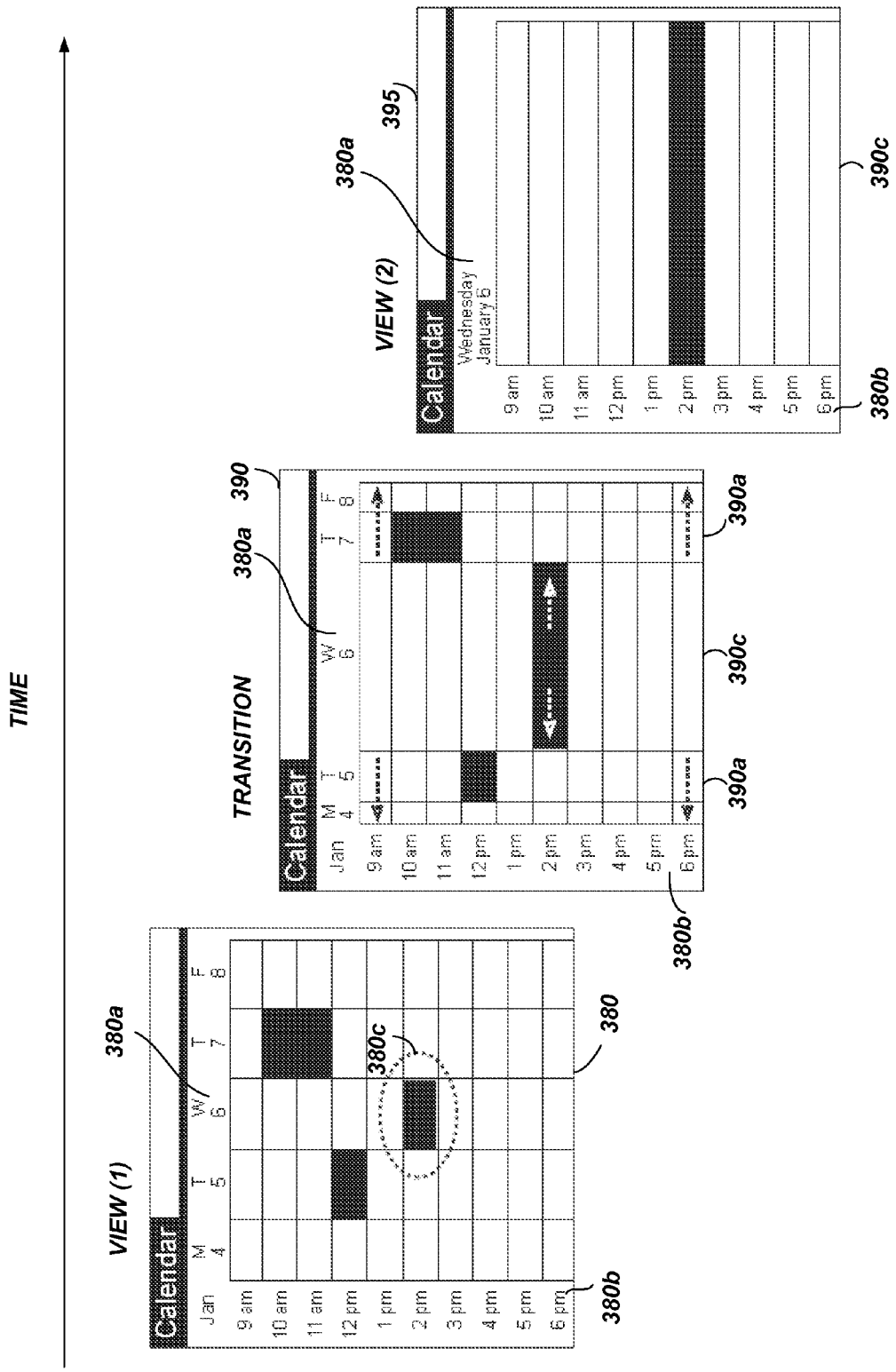
Figure 4:
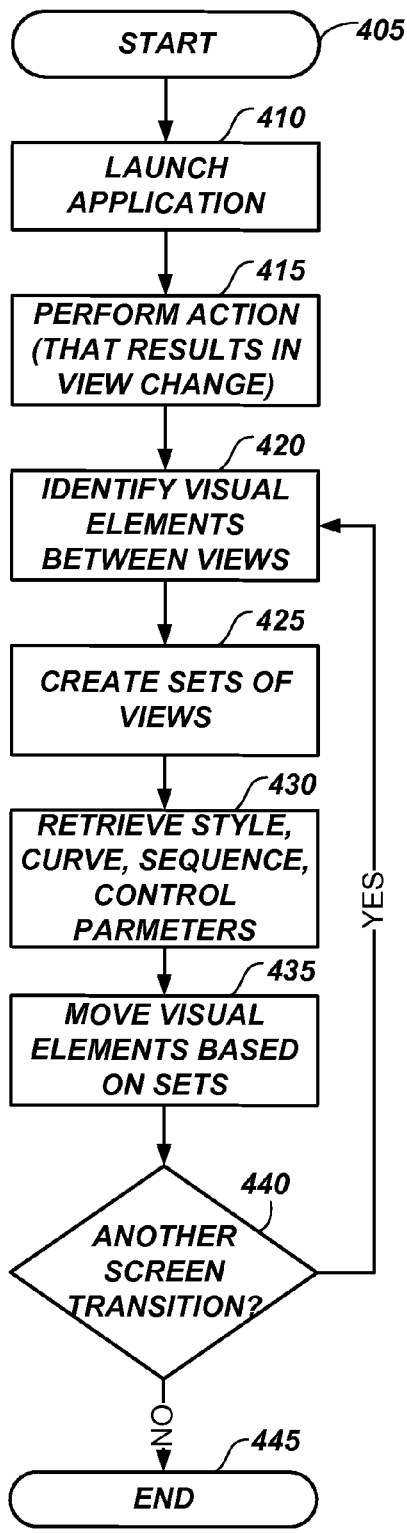
FIG. 4 illustrates one example embodiment for a process to change views through a user interface of an application.

Reference next is made to FIGS. 3a through 4 to further describe a structured display system with automatic transitions. For ease of discussion and understanding, the system will be described in the context of a mobile computing device 110. It is noted that although the example given herein is in the context of the mobile computing device 110, the principles disclosed are applicable to other computing systems such as desktop, laptop, or notebook systems.

Turning now to FIG. 3a, it illustrates one embodiment for a system to change views through a user interface of an application. A first view (view 1) 310 of an application is rendered on the screen 130. This rendered view is displayed as a user interface that is comprised of one or more visual elements (which are movable elements). In one embodiment, each view can be a structured view such that visual elements can be rendered within particular locations on the screen within the view. As will be described herein, "removal" of a view and rendering of a view is unlike conventional systems. Rather than fully remove an interface screen and redraw a new interface screen when something views in conventional systems, the disclosed system "removes" a view by only removing those visual elements uncommon between the views, retaining common visual elements and adding in new visual elements without having to redraw the whole screen for the new view. Hence, a user maintains visual continuity between views.

Depending on the particular views presented to the user, a visual element is rendered relative to the transition between the views and the views themselves. For example, a visual element may be rendered within the same location between two views so that it would not move as other visual elements are moved out of the first view and new visual element are introduced into the second view. In another example, a visual element may be moved between a first location in one view to a new first location within a second view while continuing to be visually rendered on the screen and as other visual elements are moved out of the first view and new visual element are introduced into the second view. In still another example, the visual element may be transitioned out of view (or removed) in the transition between the first view and the second view. Through this transitional approach of rendering visual element between views of a user interface, a user is able to maintain visual continuity within the application and "stay in place" with respect to the transition of view within the user interface.

When a user elects to move on to a next view, e.g., through some interaction with the application, a visual subsystem 315 facilitates the movement of the visual elements from the first view 310 to a second view 320. In one embodiment, the visual subsystem 315 includes the structured display manager 222, the transition manager 226, and the graphics manager 230.

As noted previously with FIG. 2, the structured display manager 222 is configured to manage the visual elements of an application within one or more views. In one embodiment, the structured display manager 222 receives from the application two groups of data corresponding to the visual elements corresponding to the current view of the user interface and the subsequent view of the user interface. For example, one group includes visual elements of the first view of the application and the second group includes visual elements in the subsequent second view of the application. The structured display manager 222 uses the received data corresponding to the visual elements in each view to create three groups (e.g., sets): (1) visual elements common to the two views; (2) visual elements that are removed from the first view; and (3) visual elements that are brought into the second view.

Next, the transition manager 226 uses the sets from the structured display manager 222 and applies one or more transition styles including (if application) curves, sequences and controls (or stages) for use in preparing to "remove" the first view and render the subsequent view, e.g., through a graphics manager 230.

Further, the transition manager 226, like the structured display manager 222 and the graphics manager 230, is a system level module. As a system level module, these components are configured with a system interface in which to receive and send data between applications in order to render views for the application from the system level rather than the application level. Thus, unlike conventional systems which require applications to manage user interfaces between views the present configuration is structured to manage aspects of the views at the lower levels (e.g., visual elements) so that visual consistency and continuity can be maintained.

Note that each of the visual elements is a movable visual element so that as views change, one or more of them may remain on the screen, but may be moved to another point on the screen in the changed view. Further, in one embodiment each of the movable visual elements for particular view, e.g., two successive views, is provided from an application. The structured display manager 222 receives these visual elements and determines which visual elements remain in the view, which ones are taken off the first view relative to the second view and which must be added to the second view that were not on the first view. Thereafter, the transition manager 226 determines how these visual elements are moved around between views, how they come off the view and how they are added onto the view. The graphics manager 230 assists with the actual change of the display, e.g., the rendered views, on the screen 130.

In an alternative embodiment, the structured display manager 222 may be configured to group individual discrete visual elements into a superset of visual elements that are grouped multiple visual elements together to itself be its own visual element that make up a set, for example, the set of visual elements that remains between views. For example, in a calendar application, as further described in conjunction with FIG. 4, each specific day of the week such as Sunday, Monday, Tuesday, etc. is a visual element and the entire grouping of Sunday, Monday, Tuesday, Wednesday, Thursday, Friday, and Saturday can be defined to be a separate visual element. Further, the entire grouping can be configured dynamically or as a prearranged structure. In addition, once grouped, the structured display manager 222 can separate them back to their original discrete elements.

Also in an alternative embodiment, the transition manager 226 functions with the graphics manager 230 to maintain continual and consistent visibility of those one or more movable elements on the screen 130 during the transition from the first view 310 to the rendering of the second view 320. Using the sets of data of which visual elements to maintain, remove, and add between views from the structured display manager 222, the transition manager 226 retrieves system configuration data from a transition style function (or module), including, if applicable, its curve, sequence and control functions (or sub-modules), for use by the system for movement and placement visual elements on the screen 130 in transitioning between the first view and the second view.

By managing views for applications from a system level rather than application level, the disclosed system advantageously maintains visual continuity and consistency before, during and after transitions between views. In one embodiment, the transition appears as a "morphing" from one view to the next view. Unlike conventional systems in which visual continuity is lost when application screens change as each new view is rendered (e.g., redrawing, repainting, or regenerating the entire screen on the display), the disclosed system beneficially allows a user to maintain visual continuity with one or more elements of the application screen as it changes from one view to another view. In doing so, a user is able to feel that they can remain in-place visually within the screen as views change. Moreover, by managing such operations at a system level, such transitions also remain visually consistent across applications. In addition, a rich, large, complex vocabulary (e.g., definitions of curves, course, movement, etc.) set of transitions is provided across all applications operating within the system, hence offloading applications from having to independently define and implement these concepts. Therefore, application development can also be simplified by leveraging the system and processes as disclosed.

To further illustrate the disclosed system, FIGS. 3b and 3c illustrate example embodiments of an application with having transitions from a first view to a second view as viewed through a screen of a mobile computing device. Referring first to FIG. 3b, a simplified directory application that uses a web service is described with the user interface as shown. In this example, the application is a "Places to Go" location based service application that lists places of interest relative to the location of the mobile computing device 110. It is noted that in this example embodiment, the interface may be viewed through an application executing on the device 110 and viewed through the screen 130. In addition, the device 110 in this example may include an integrated global positioning subsystem and/or be functional with a global positioning system (GPS) that interoperates with, for example, a web browser, to retrieve data relative to location and interest category.

Continuing with the example, reference will be made to both FIGS. 3a and 3b. In the first view (view (1)) 350 the interface displayed (e.g., on the screen 130) has a title visual element 350 "Places to Go", a title separator visual element 350b, and a selectable list of additional visual elements 350c-f, each of which correspond to a place to go relative to a location of the device (as determined through the GPS). In this example, reference will be made to a user selecting one of the selectable visual elements 350c-f, e.g., through a stylus in conjunction with a touch screen or a navigation element (e.g., 145). In particular, in this example reference will be base to a selection of "Bars" by the user.

With the selection of "Bars" made, the application transmits to the visual subsystem 315 the list of visual elements of the first view 350 and the list of visual elements for the second view 370. The structured display system 222 of the visual subsystem 315 creates sets of visual elements corresponding to which visual elements remain from the first view, which are removed from the first view, and which are added to the second view. This information is used by the transition manager 226 to transition the interface from the first view 350 to the second view 360.

The transition manager 226 manages the transition of the visual elements between the first view 350 and the second 360 and works with the graphics manager 230 to display on the screen the changes as they occur. This allows the user to maintain visual continuity. Moreover, as a system level module, the transition manager 226 uses system defined transition style, including, if applicable, curve, sequence, and control definitions, to maintain visual consistency with other applications that execute within the device 110.

In the present example, the transition between the first view 350 and the second view 370 is illustrated through a "snapshot" of a transition view 360 in FIG. 3b. The snapshot merely represents a point in time captured on the screen during the transition process which is fully visible to the user. The transition manager 226 retrieves the system information corresponding to the transition style, including appropriate curve, sequence, and control definitions. In this example, transition manager retrieves, for example, from system storage (such as flash memory 214) a style corresponding to how visual elements transition off the screen, within the screen and onto the screen. The curve in this example is linear movement pattern of the visual elements. The sequence is grouped as visual elements leaving the view, visual elements remaining and moving within the view and visual elements added to the view.

Based on the system specified style, curve, sequence, and control definitions for this example, the transition manager 226 slides all the visual elements of the set that are to be removed out linearly through the left or right side of the view 360. The particular direction may be governed by the closest "exit" from view or if either exits is relatively equi-distant, the default in such cases may be to just remove from one side or the other, e.g., to the left. In addition, note that if there are visual elements that remain on screen that "block" a side, then the removed visual elements would be removed with the appearance of "disappearing" behind the visual elements that remain in the view.

Next in the defined system transition style the transition manager 226 linearly slides up the selected visual element, "Bar" 350d, toward the top of the screen to be the title visual element. Thereafter, in the defined system style, curve, sequence, and control definitions, the transition manager 226 adds the visual elements corresponding to the set of added visual elements by introducing them into display linearly from the bottom (new selectable visual elements 360b-f for the new (i.e., the second) view 370) and right side of the view 360 (e.g., separator line 360a for the new view 370). When each visual element comes to rest the result is the second view (or "view (2)") 370. Hence, the first viewed "morphed" into the second view and maintained visual continuity.

It is noted that the sequencing need not be linear (i.e., start next in sequence after prior in sequence has completed), but rather can be overlapped (i.e., the next in sequence starts after the prior in sequence has already been started). When overlapped, the view as displayed on the screen appears to be "in motion" between the two views 350, 370 as the transition (e.g., 360) occurs.

Referring next to FIG. 3c, this figure shows another example of managing views from a system level in accordance with the disclosed configurations. FIG. 3c illustrates an example calendaring application. In this example, the calendaring application is presumed to be operation on the same device as the directory application described in FIG. 3b. In a first view (e.g., as seen on a screen 130 of the device 110) 380 the calendar application illustrates a work week of a month in grid format. The columns show days and dates of the week from Monday the $4^{th}$ through Friday the $8^{th}$ and the rows show "office" hours from 9 AM to 6 PM. The intersection of the columns and rows illustrate blocks of particular one-hour segments on particular days in which activities may be scheduled. The intersections showing black boxes may be indicative of activities in the calendar at that particular time slot on that particular day (e.g., perhaps lunch on Tuesday the $5^{th}$ from noon to 1 PM).

Continuing with this example, the user may seek to enter a new entry for Wednesday the $6^{th}$ at the 2 PM block. A process would start with the user making a selection with the particular time slot (e.g., by selecting it with a stylus on a touch screen or navigating to it through a navigation switch) in the first view 380. The calendar application transmits the visual elements in the first view 380 and the second view 395 to the structured display manager 222. The structured display manager 222 creates sets of visual elements corresponding to the visual elements that remain, are removed, and are added between the first view 380 and the second view 395.

The transition manager 226 uses the system style, curve, sequence, and curve definitions (one or some subset of them based on system configuration) to transition between views 380, 395 (including the transition itself 390) working with the graphics manager 230 to display on the screen 130. Hence, the transitions appear substantially similar to those of the directory application. In particular, the visual elements that are removed 390a are pushed to the sides and the visual element that remains 390c is expanded so that in the final view it covers a substantial portion of the second view 395. The removal of visual elements 390a and expansion of the visual element 390c is illustrated in a "snapshot" view 390 with the arrows indicating what movement may be observed on a screen 130. No visual elements are added in this transition, and therefore, there are no transitions associated with introducing visual elements from the first view to the second.

In this example, day visual elements on either side of Wednesday the 6th 380a are removed through opposite sides, specifically the side closes to the removed elements. The individual time visual elements 380b remain on screen so that the removal of the Monday the 4th and Tuesday the 5th day visual elements results in disappearance of those visual elements behind the time visual elements 380b. On the other side, the Thursday the 7th and Friday the 8th day visual elements slide off to the right off the screen. It is noted in alternative embodiments, the style and curve definitions can be configured so that rather than leave the view by moving off screen 130, the visual elements may appear to be collapsed out of view, e.g., into a visual element on one side or another of the screen.

In addition, visual elements of particular interest, e.g., the selection 350d made on the initial screen, remains in view as it changes location allowing for visual continuity. Further, the use of system defined styles, curves, sequences and controls (or some subset thereof) ensures that each application retains consistency with respect to rendering of views as views "morph" between each other.

In some embodiments, the system may include preset styles, curves, sequences and controls for application that can be overridden under particular predefined system rules. The capability to override the system configuration when such rules are triggered (or implicated) increases system flexibility. For example, when system resources are heavily constrained due to parallel activities, e.g., downloading a media file to the device 110 while engaged in a phone call on the device, rather than apply more computationally intensive curves and overlapping sequences for movement of visual elements as may be the default, the system may use linear curves (or other less computationally intensive curves) and serial or no (i.e., all moved together) sequences for the movement visual elements. It is noted in the example provided that the maximum degradation can be configured so that zero transitions occur. In addition, it is further noted that the override rules may be built into the system as a rules definition (or module).

To optimize capability and performance of a particular device, the system can be configured accordingly. For example, a device having lower performance hardware and/or software components may be fitted with definitions that correspond to fewer, less complex transitions managed from the system level. Similarly, a device having higher performance can be fitted with definitions that correspond to greater, more complex transitions managed from the system level.

It is further noted that the rules module may include an application programming interface (API) that may be configured to receive rules for storage and later use from sources external to the system level, for example, an application or a user. Thus, the system allows for easier application integration and may also allow updates at the system level that are available across all applications without having to individually update applications.

It is noted that the system can be configured for reversibility with the transition style applied the same in both directions. That is the transition style is the same in a forward direction and (e.g., from a current view to a next view) and back from it (e.g., from the current view to the prior view), for example, similar to a video play-reverse. In an alternate embodiment, the system can be configured for more robust reversibility whose applied style is at least partially independent of the other direction. For example, in the reverse direction a course may not change, but the curve would be different than the forward direction. Hence, by way of example, a gradually accelerated movement forward (e.g., current view to the next view) would be gradually accelerating in reverse rather than decelerating. Further, as with the transitions described above, the principles of transitions can be applied to any number for screens either in a "forward" or "reverse" direction.

FIG. 4 illustrates one example embodiment for a process to change views through a user interface of an application. The process may be executed through instructions that correspond to the visual subsystem 315, and particularly the structured display manager 222 and the transition manager 226. It is noted that the instructions are storable in a tangible medium, e.g., a flash disk, a Compact Disc, or the flash memory 214 and/or RAM 216 of the device 110. The instructions are executable by a processor, e.g., the processor 220 of the device 110.

In this example, the process starts 405 with launching (or executing) an application 410, e.g., the directory application or the calendar application. The application can be configured to launch at system initialization or upon user selection or instruction to run. The process receives instructions, e.g., from user selection of an action, that causes it to perform 415 an action that will result in a view transition, e.g., changing from a month view to a week view (or vice versa). The process, through the application, identifies 420 the visual elements in the first and second views for the structured display manager 222. The structured display manager organizes the view elements data to create 425 sets corresponding to visual elements that were in the first view but will be not be present in the second view, visual elements that remain from the first view, and visual elements that were not in the first view that will be in the second view.

The process, through the transitions manager 226 retrieves 430 the system level configuration parameters (or modules) that define style, curve, sequence and control for management of visual elements for user interface actions in the device 110. Based on the sets from the structured display manager 222 and the retrieved style, curve, sequence and control, the transition manager 226 accordingly moves 435 the visual elements between the first view and the second view, all the while displaying the transition of elements on the screen 130 of the device 110. If the process determines 440 there is another screen transition, the process starts with the application identifying 420 the visual elements of the two views (the view that was first and the successive (or second) view). If the process determines 440 there are no more present transitions between views, the process ends 445 for now.

In each transition it is noted that the process maintains common visual elements that are common between successive views through maintaining their visual appearance in the transition between views. Moreover, because system level parameters are used for managing user interface actions within an application, rather than having the application manage those aspects, the system also maintains visual consistency. In some embodiments, the transition appears as a morphing; by leveraging system level definitions for such transaction each successive view morphing appears consistent. The continuity and consistency allows for activities involving the user interface to occur quickly without disrupting the user. Moreover, the visual continuity and consistency of manipulation of visual elements between views provides benefits that allows users to maintain concentration and focus on particular visual elements of interest between subsequent and/or multiple views, which can help increase productivity.

Although the process described herein has been in the context of a mobile computing device and a data retrieval and calendar application, the principles disclosed herein are applicable to other computing devices and platforms (e.g., a personal computer running a Microsoft Windows, Apple Mac, or RedHat Linux operating system) and other applications such as a spreadsheet, a project management application, an electronic program guide (e.g., an entertainment program guide), or data analysis tools that permit drilling down on particular pieces of data (i.e., each view provides more data on selected data from a prior view).

Some portions of above description describe the embodiments in terms of algorithms and symbolic representations of operations on information. These algorithmic descriptions and representations are commonly used by those skilled in the data processing arts to convey the substance of their work effectively to others similarly skilled in the art. These operations, while described functionally, computationally, or logically, are understood to be implemented by computer programs or equivalent electrical circuits, microcode, and the like. Further, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a structured display with automatic transitions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for maintaining visual continuity of visual elements in a user interface for an application, the method comprising:

receiving, in response to a selection in a first user interface view of the application, an instruction to transition from the first view to a second user interface view of the application, each view including a plurality of visual elements;

receiving, from the application, the visual elements corresponding to the first view and the visual elements corresponding to the second view;

determining sets of visual elements from the visual elements corresponding to the first view and the visual elements corresponding to the second view, each set comprising one of visual elements removed between the first view and the second view, visual elements retained from the first view in the second view, and visual elements added between the first and the second view;

retrieving, for each set of visual elements, a system defined transition style for rendering the set of visual elements between the first view and the second view; and rendering each set of visual elements on a screen responsive to the system defined transition style to transition the first view to the second view.

2. The method of claim 1, wherein the system defined transition style for rendering a set of retained visual elements retains visual continuity during a transition by moving the visual elements, while the visual elements remain in view on the screen, from their locations in a first view to their locations in a second view.

3. The method of claim 1, wherein the system defined transition style for rendering a set of removed visual elements retains visual continuity during a transition by moving the visual elements, while the visual elements remain in view on the screen during a transition, from their locations in a first view to off from the screen.

4. The method of claim 1, wherein the system defined transition style for rendering a set of added visual elements retains visual continuity during a transition by gradually adding the visual elements, while other visual elements remain in view on the screen during a transition, to their locations in a second view on the screen.

5. The method of claim 1, wherein the system defined transition styles for rending sets of visual elements define the alteration, removal or addition of visual elements on the screen during a transition between views.

6. The method of claim 5, wherein the transition styles further comprise a curve that defines a function for movement characteristics of a visual element altered in the view, removed from the view, or added into the view during the transition.

7. The method of claim 5, wherein the transition styles further comprise a defined sequence for movement of a visual element altered in the view, removed from the view, or added into the view during the transition, the sequence defining when the visual elements move on the screen during the transition.

8. The method of claim 5, wherein the transition styles further comprise a control that defines a movement path on the screen for placement of a visual element during the transition.

9. The method of claim 1, wherein the system defined transition style for rendering a set of retained visual elements retains visual continuity during a transition by re-proportioning the visual elements, while the visual elements remain in view on the screen, from their sizes on the screen in the first view to their sizes on the screen in the second view.

10. A system level user interface subsystem comprising a non-transitory computer-readable storage medium storing executable computer program instructions as one or more modules for maintaining visual continuity of visual elements in a user interface for an application, the subsystem comprising:
    a structured display module configured to:
        receive, in response to a selection in a first user interface view of the application, visual elements corresponding to the first view and visual elements corresponding to a second user interface view of the application, the selection corresponding to an instruction to transition from the first view to the second view; and
        determine sets of visual elements from the visual elements corresponding to the first view and the visual elements corresponding to the second view, each set comprising one of visual elements removed between the first view and the second view, visual elements retained from the first view in the second view, and visual elements added between the first and the second view; and
    a transition module configured to:
        retrieve, for each set of visual elements, a system defined transition style for rendering the set of visual elements between the first view and the second view;
        obtain the sets of visual elements from the structured display module; and
        apply, for each set of visual elements, the system defined transition style to transition the first view to the second view;
    a processor for executing subsystem modules.

11. The subsystem of claim 10, wherein the system defined transition styles for rendering sets of visual elements define the alteration, removal, or addition of visual elements on the screen during a transition between views.

12. The subsystem of claim 10, wherein the system defined transition style for rendering a set of retained visual elements retains visual continuity during a transition by moving the visual elements, while the visual elements remain in view on the screen, from the location in a first view to their locations in a second view.

13. The subsystem of claim 10, wherein the transition style for rendering a set of removed visual elements retains visual continuity during a transition by moving the visual elements, while the visual elements remain in view on the screen during a transition, from their location in a first view to off from the screen.

14. The subsystem of claim 10, wherein the transition style for rendering a set of added visual elements retains visual continuity during a transition by gradually adding the visual elements, while other visual element remain in view on the screen during the transition, to their location in a second view on the screen.

15. The subsystem of claim 11, wherein the transition styles further comprise a curve, the curve defining a function for movement characteristics of a visual element altered in the view, removed from the view, or added into the view during the transition.

16. The subsystem of claim 11 wherein the transition styles further comprise a defined sequence, the defined sequence defining movement of a visual element altered in the view, removed from the view, or added into the view during the transition the sequence defining when the visual elements move on the screen during the transition.

17. The subsystem of claim 11, wherein the transition styles further comprise a control, the control defining a movement path on the screen for placement of a visual element during the transition.

18. The subsystem of claim 10, wherein the system defined transition style for rendering a set of retained visual elements retains visual continuity during a transition by re-proportioning the visual elements, while the visual elements remain in view on the screen, from their sizes on the screen in the first view to their sizes on the screen in the second view.

19. A non-transitory computer readable medium storing instructions thereon, the instructions when executed by a processor cause the processor to:
    receive, in response to a selection in a first user interface view of an application, an instruction to transition from the first view to a second user interface view of the application, each view including a plurality of visual elements;
    receive, from the application, the visual elements corresponding to the first view and the visual elements corresponding the second view;
    determine sets of visual elements from the visual elements corresponding to the first view and the visual elements corresponding to the second view, each set comprising one of visual elements removed between the first view and the second view, visual elements retained from the first view in the second view, and visual elements added between the first and the second view;
    retrieve, for each set of visual elements, a system defined transition style for rendering the set of visual elements between the first view and the second view; and
    render each set of visual elements on a screen responsive to the system defined style to transition the first view to the second view.

20. The computer readable medium of claim 19, wherein the system defined transition style for rendering a set of retained visual elements retains visual continuity during a transition by moving the visual elements, while the visual elements remain in view on the screen, from their locations in a first view to their locations in a second view.

21. The computer readable medium of claim 19, wherein the system defined transition style for rendering a set of removed visual elements retains visual continuity during a transition by moving the visual elements, while the visual elements remain in view on the screen, from their locations in a first view to off from the screen.

22. The computer readable medium of claim 19, wherein the system defined transition style for rendering a set of added visual elements retains visual continuity during a transition by gradually adding the visual elements, while other visual elements remain in view on the screen during a transition, to their locations in a second view on the screen.

23. The computer readable medium of claim 19, further comprises instructions that cause the processor to retrieve a control that defines a movement path on the screen for placement of a visual element during a transition.

24. The computer readable medium of claim 19, further comprises instructions that cause the processor to retrieve a curve that defines a function for movement characteristics of a visual element altered in the view, removed from the view, or added into the view during a transition.

25. The computer readable medium of claim 19, further comprises instructions that cause the processor to retrieve a sequence definition that defines movement of a visual element altered in the view, removed from the view, or added into the view during a transition, the sequence defining when the visual elements move on the screen during the transition.

26. The computer readable medium of claim 19, wherein the system defined transition style for rendering a set of retained visual elements retains visual continuity during a transition by re-proportioning the visual elements, while the visual elements remain in view on the screen, from their sizes on the screen in the first view to their sizes on the screen in the second view.

* * * * *

UNITED STATES PATENT AND TRADEMARK OFFICE
CERTIFICATE OF CORRECTION

PATENT NO.        : 8,004,541 B2
APPLICATION NO.   : 12/021173
DATED             : August 23, 2011
INVENTOR(S)       : Paul Mercer et al.

It is certified that error appears in the above-identified patent and that said Letters Patent is hereby corrected as shown below:

In column 16, line 14, in Claim 16, delete "transition" and insert -- transition, --, therefor.

In column 16, lines 35-36, in Claim 19, delete "corresponding the" and insert -- corresponding to the --, therefor.

Signed and Sealed this
Eighth Day of May, 2012

David J. Kappos
*Director of the United States Patent and Trademark Office*